United States Patent
Rudolf et al.

(10) Patent No.: US 8,210,039 B2
(45) Date of Patent: Jul. 3, 2012

(54) VIBRATING GYROSCOPE WITH QUADRATURE SIGNALS REDUCTION

(75) Inventors: Felix Rudolf, Corcelles (CH); Roberto Frosio, Neuchatel (CH); Pascal Zwahlen, Auvernier (CH); Bertrand Dutoit, Baulmes (CH)

(73) Assignee: Colibrys, SA, Neuchatel (CH)

( * ) Notice: Subject to any disclaimer, the term of this patent is extended or adjusted under 35 U.S.C. 154(b) by 578 days.

(21) Appl. No.: 12/398,457

(22) Filed: Mar. 5, 2009

(65) Prior Publication Data

US 2009/0223277 A1 Sep. 10, 2009

(30) Foreign Application Priority Data

Mar. 5, 2008 (EP) .................................... 08152320

(51) Int. Cl.
*G01C 19/56* (2012.01)
(52) U.S. Cl. .................................................. 73/504.12
(58) Field of Classification Search ............... 73/504.12, 73/504.14, 1.37
See application file for complete search history.

(56) References Cited

U.S. PATENT DOCUMENTS

| | | | |
|---|---|---|---|
| 6,571,630 B1 | 6/2003 | Weinberg et al. | |
| 6,619,121 B1 * | 9/2003 | Stewart et al. | 73/504.02 |
| 6,868,725 B2 * | 3/2005 | Stewart | 73/504.12 |
| 7,051,590 B1 | 5/2006 | Lemkin et al. | |

FOREIGN PATENT DOCUMENTS

WO 03/010492 A1 2/2003

OTHER PUBLICATIONS

European Search Report dated Aug. 15, 2008.

* cited by examiner

*Primary Examiner* — John Chapman, Jr.
(74) *Attorney, Agent, or Firm* — Pearne & Gordon LLP

(57) ABSTRACT

A vibrating gyroscope includes a proof mass (1); a spring suspension system (5, 6, 7, 8; 9) for suspending the proof mass; an electrical drive mechanism for vibrating the proof mass along a drive axis (x); and electrodes (2, 3) for building together with at least a part of the proof mass (1) a capacitance system for detecting moves of the proof mass along a sense axis (z) perpendicular to the drive axis. The gyroscope is arranged so that quadrature forces generate displacements of the proof mass without substantially displacing the neutral point (10) of the proof mass along the sense axis (z). This may be achieved by tilting the proof mass while keeping its neutral point at a constant position along the sense axis, or by applying a constant electrostatic force.

22 Claims, 5 Drawing Sheets

VIBRATING GYROSCOPE WITH QUADRATURE SIGNALS REDUCTION

CROSS-REFERENCE TO RELATED APPLICATIONS

This application claims the priority of EP08152320 filed Mar. 5, 2008, the content of which is enclosed by reference.

The present application is further related to European Patent Application EP08152329 filed Mar. 5, 2009, the content of which is included herewith by reference.

BACKGROUND OF THE INVENTION

1. Field of the Invention

The present invention relates generally to rotational motion sensor, such as gyroscopes, and more specifically, but not exclusively, to micromachined, mems-based, sensing vibrating gyroscopes for measuring angular velocity and, optionally, acceleration.

2. Description of Related Art

Vibrating gyroscopes rely on the vibration of a proof mass in one direction and in detecting the Coriolis force generated in a perpendicular direction by the rotational speed. Vibrating gyroscopes are formed, for example, by etching a semiconductor to form a proof mass suspended by a spring system, such as elastic beams, to the substrate. An electronic drive circuit which may be on the same substrate applies an alternating drive current to driving electrodes which vibrate the proof mass in a drive direction. The sensor further comprises sensing electrodes for detecting displacements of the proof mass in a sensing direction orthogonal to the drive direction. Those displacements may be caused by a Coriolis force when an angular velocity is applied to the gyroscope, and used for measuring this velocity. Accelerations applied to the sensor along the sense axis may be measured, in a different frequency band, with the same sensing electrodes.

The production process and the technology used for producing the springs and the beams in mems (micro electrical mechanical systems)-based gyroscopes often lead to quadrature errors, i.e. errors caused by driving the vibrating proof mass along a direction which is not exactly perpendicular to the direction along which the Coriolis movement is measured. The component of the vibrating drive movement in the sense direction generates an output signal (the quadrature signal) superposed to the signal caused by the Coriolis force or by the acceleration.

The quadrature output signal is in phase with the drive signal used for driving the proof mass, while the component of this output signal due to the Coriolis force is phase shifted. Electronic demodulation circuits are thus known in the art for separating those two components. An accurate separation is however difficult especially when the amplitude of the quadrature signal is large compared with the Coriolis sense signal.

Additional electrodes or mechanical trimming for reducing the quadrature forces and the quadrature signal have been suggested. Those additional components and trimming processes add to the complexity and cost of the system.

U.S. Pat. No. 6,571,630 B1 uses material ablation or deposition to reduce quadrature forces. U.S. Pat. No. 7,051,590 B1 describes an example of quadrature nulling electronic circuit that measures quadrature errors and applies corresponding compensation. Such a quadrature nulling circuit is difficult to build, and often introduces problems of phase uncertainty.

WO-A1-03/010492 describes a quadrature nulling method in which quadrature servo applies sinusoidal forces to a sensing element. This method uses a proof mass with a scalloped edge for modulating mechanically the DC signal from the quadrature servo. This solution avoids the problems of phase uncertainty in AC servo signals, but still requires an electronic quadrature servo circuit for actively compensating the quadrature forces.

It is therefore an aim of the invention to propose a new gyroscope in which the quadrature errors and the quadrature signal are reduced.

It is another aim of the invention to propose a new gyroscope in which the quadrature errors and the quadrature signal may be reduced even when no quadrature servo circuit is used, or when the quadrature signal is unknown.

In the present document, a quadrature force designates any force along the sense axis in phase with the drive signal oscillation. A quadrature signal designates a component or part of the output signal caused by those quadrature forces. Quadrature signals designate in particular detrimental signals which are superposed to the output sense signal and which are caused by unwanted displacements of the proof mass along the sense axis when the proof mass is vibrated. In this application, a neutral point designates a point in the proof mass such that a rotation around an axis passing through the neutral point will essentially not lead to a change in the capacitive output signal. For example, in the case of a flat proof mass with constant thickness, the neutral point corresponds to the center of gravity of the proof mass.

BRIEF SUMMARY OF THE INVENTION

The invention relates in some aspect with the finding that in a gyroscope, displacements of a proof mass caused by quadrature forces do not always generate quadrature signals and are not always detrimental to the precision. More specifically, it has been found that unwanted displacements of the proof mass are only detrimental if the neutral point of the proof mass moves along the sense axis.

In contrast, displacements of the proof mass caused by quadrature forces but along other axis than the sense axis have nearly no impact on the output signal, and thus do not affect the accuracy of the measurements.

Even translations and/or rotations of the proof mass along the sense axis have no or only little impact on the output signal, as long as the position of the neutral point of the proof mass remains substantially constant along the sense axis.

According to an aspect of the invention, a vibrating gyroscope may thus comprise:
  a proof mass;
  a spring suspension system for suspending the proof mass;
  an electrical drive mechanism for vibrating the proof mass along a drive axis;
  electrodes for building together with at least a part of the proof mass one or several capacitances, whereas the value of the capacitance changes when the proof mass moves along a sense axis perpendicular to the drive axis;

The geometry and mechanic of the gyroscope are arranged so that quadrature forces generate displacements of the proof mass without substantially displacing the neutral point of the proof mass along the sense axis. "Substantially" means here for example that the residual displacements are negligible. In one aspect, substantially could also include displacements acceptable for one particular application, or displacements that can be compensated electronically without any highly sophisticated circuit.

The solution has the advantage that only the position of a specific point of the proof mass along a single axis needs to be controlled. As other displacements of the proof mass are allowed, this gives more possibilities to design a gyroscope insensitive to quadrature.

The quadrature signal reduction may be achieved by designing and adjusting the mechanical structure in such a way as to cancel any forces in the sense direction acting on the neutral point while allowing the proof mass to oscillate around an axis passing through the neutral point. These quadrature forces are cancelled by balancing the spring forces and inertial forces both related to the proof mass rotation. This may be obtained by a proper choice of the spring constants, the mass, and/or the moment of inertia of the proof mass.

In one embodiment, the quadrature signal reduction may also be obtained by a proper adjustment of the position of the neutral point in the sense direction for example by applying a constant electrostatic force (i.e., not a servo force) in the sense direction.

Furthermore, the proof mass may be associated to a second vibrating part whose displacements are not detected but increases the moment of inertia of the vibrating system, giving even more design freedom.

Various methods for making the position of the neutral point insensitive to quadrature forces can also be combined.

The gyroscope thus does not need any electronic quadrature servo compensation circuit; quadrature forces are not cancelled, but the geometry of the gyroscope is carefully arranged in such a way that those forces do not displace the neutral point of the proof mass, and thus do not change the signal measured by the sense electrodes.

An active electronic quadrature reduction circuit may be used additionally, in order to cancel or reduce quadrature forces which may cause residual displacements of the proof mass.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
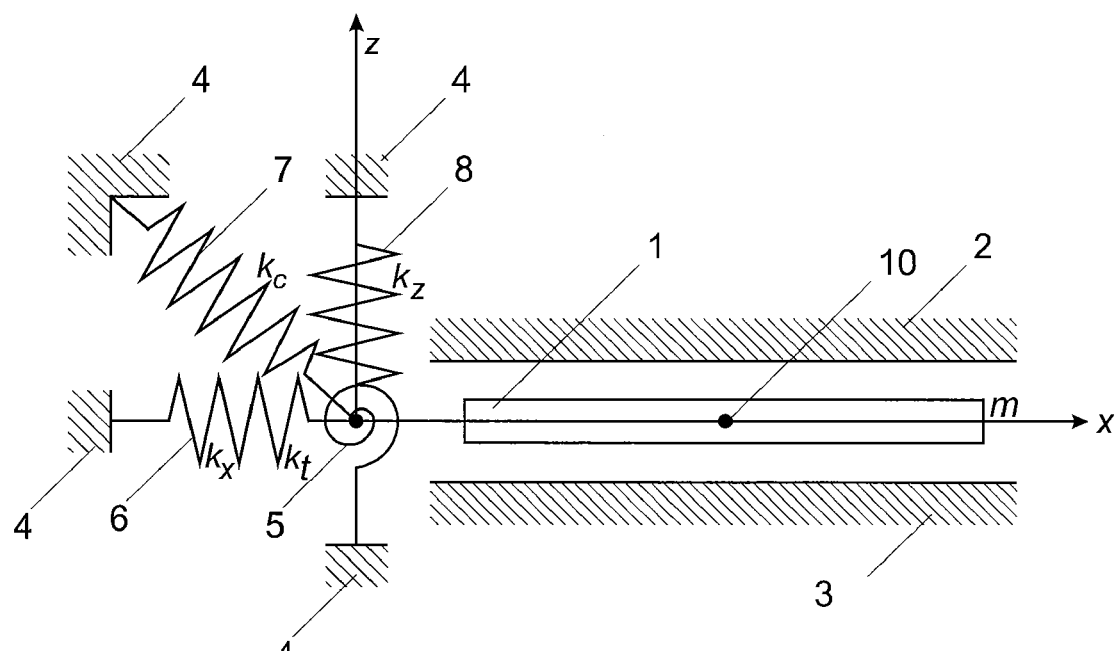
FIG. 1 is a schematic view of the general structure of a vibrating gyroscope.

FIG. 1 schematically illustrates a model of an example of vibrating gyroscope, which may be realized for instance but not necessarily using mems-technology. The illustrated gyroscope generally comprises a proof mass 1 which is suspended by the springs 5, 6, 7, 8 in such a way that the proof mass has essentially three degrees of freedom relative to the substrate 4; the other degrees of freedom are either undetectable or otherwise irrelevant. The spring suspension system is schematically represented here by four equivalent springs, namely a first longitudinal spring 6 with a constant $k_x$ along the x axis, a second coupling spring 7 with a constant $k_c$ corresponding to quadrature forces in the z direction due to a deflection in the x direction, a third longitudinal spring 8 with a constant $k_z$ along the z axis, and a fourth spring 5 with a constant $k_r$ acting on rotations in a x-z plane, around an axis close to the spring attachment point. In this document, the x axis will also be called the drive axis and the z axis the sense axis.

In a preferred embodiment, the proof mass 1 in the form of a plate is suspended by the spring suspension system in such a way that the plate has essentially three degrees of freedom: translation along the x axis, a translation along the z axis and rotation in the x-z plane. The spring suspension system is arranged such that the remaining three degrees of freedom can be neglected.

In an embodiment, the spring suspension system has a resonant frequency such that the frequency of the oscillations along the sense axis z is substantially lower than the drive frequency applied for vibrating the proof mass along the axis x. There is thus no need to adjust precisely the resonant frequency of the mechanical system.

The gyroscope schematically illustrated on FIG. 1 further comprises an upper sensing electrode 2 and a lower sensing electrode 3. The electrodes 2, 3 build together with the proof mass 1 is a capacitive system with two capacitors whose values depend on the distance between each sensing electrode and the proof mass. The position of the proof mass along the sense axis z can be measured by an electronic circuit (not shown) by evaluating both capacitances between the two sensing electrodes 2, 3 and the proof mass. The output circuit may thus deliver an output sense signal that depends on the displacement of the proof mass along the sense axis z and that may be changed by Coriolis forces, accelerations along the z-axis and quadrature forces.

The electrodes 2, 3, and/or other electrodes not shown, may also be available for driving the proof mass along the drive axis x and, optionally, for controlling its position along the sense axis z.

Figure 2:
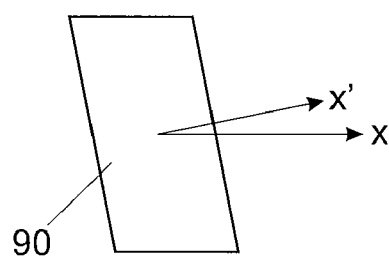
FIG. 2 schematically illustrates the displacement of the tip of a straight beam due to a drive force along the x axis. The tilted sidewalls of the beam cause a displacement of the beam along a different direction, thus generating quadrature forces.

FIG. 2 schematically illustrates the tip 90 of a straight beam 9 that may be used as spring suspension system, or as a part of such a spring suspension system, for suspending the proof mass 1 to the substrate 4. Due to spring imperfections resulting from by the manufacturing process, the sidewalls of the beams are tilted. A drive force acting along the drive axis x thus moves the beam 9 along a different direction x', including a quadrature component parallel to the sense axis z. The proof mass 1 is translated in the z direction and tilted around an axis parallel to y. The spring imperfection may be modelized by the coupling spring constant $k_c$ on FIG. 1.

Figure 3:
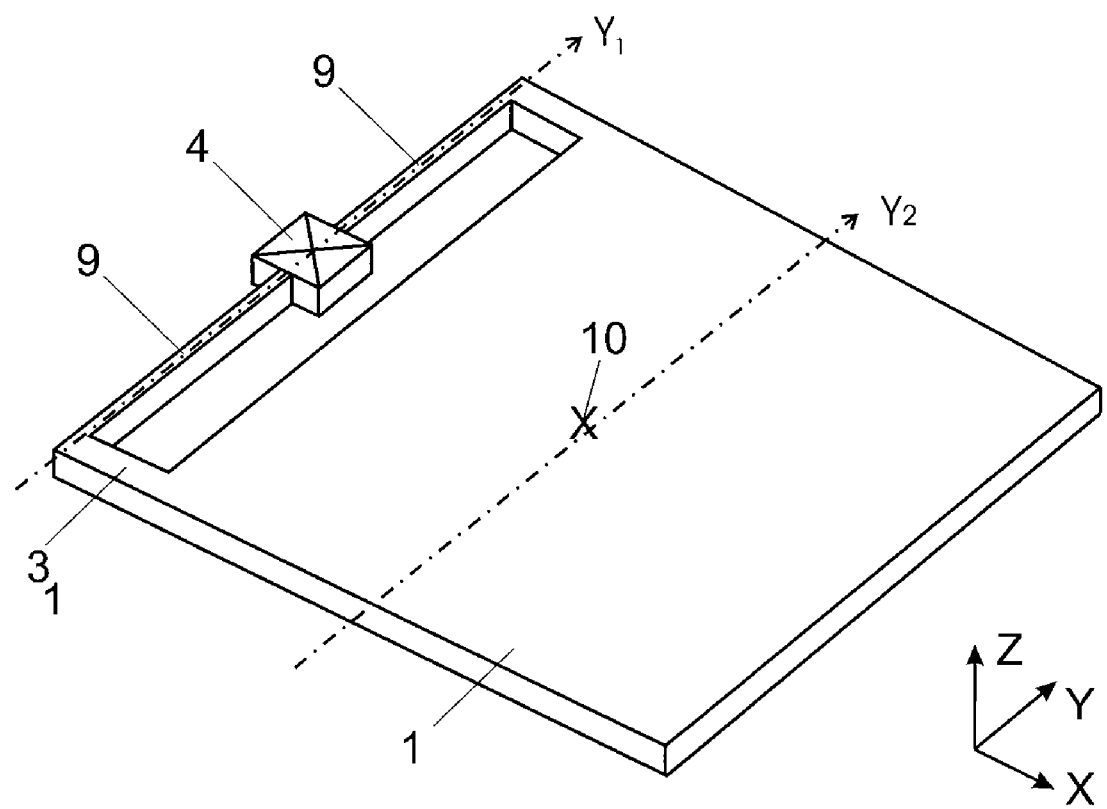
FIG. 3 illustrates a possible embodiment of a proof mass in the form of a plate suspended by straight beams to a substrate.

FIG. 3 illustrates a possible embodiment of the proof mass and spring suspension system. One side of the proof mass 1 in the form of a plate is connected by rigid beams 13 to straight beams 9 acting as springs. The other end of the beams is attached to the substrate 4. Additional springs and/or other types of springs, including folded beams, may be used for suspending the proof mass to the substrate 4.

In drive mode, the springs 9 are bent and the proof mass is moved along the drive axis x. This drive mode is used to excite the vibration of the proof mass 1 and give rise to Coriolis forces that are used to measure rotation rates.

Displacements of the proof mass along the sense axis z result from Coriolis forces causing torsion of the spring system 9 around an axis $y_1$ parallel to y and close to the attachment point of the spring system to the substrate. Quadrature forces also rotate the proof mass along a different axis $y_2$ parallel to y but crossing the plate. In an embodiment according to the invention the axis $y_2$ passes through or close to a neutral point 10. In this specific, not limiting example, the neutral point is equivalent to the center of gravity of the proof mass.

Figure 4A:
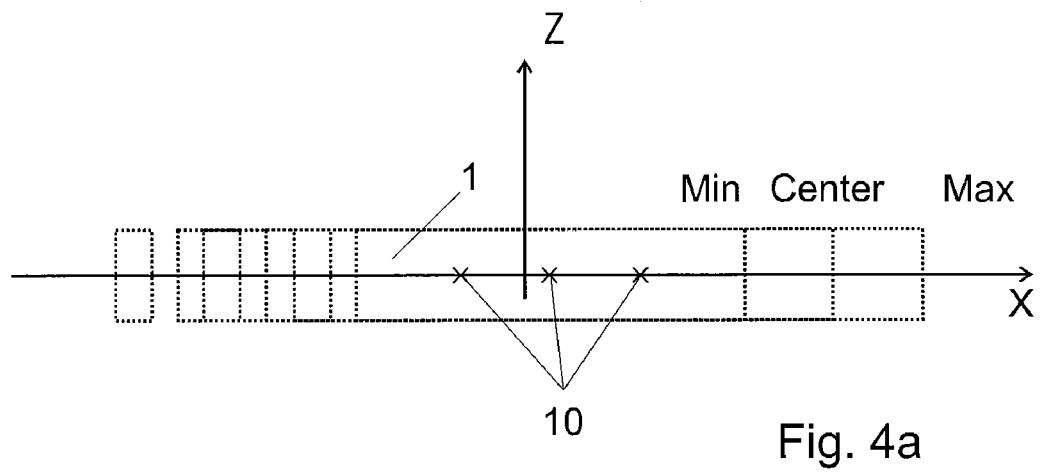
FIGS. 4a to 4c schematically illustrate a side view of the proof mass in three different positions along the drive axis.

FIG. 4a is a schematic side view of a proof mass 1 with an ideal spring suspension system 9 in three different positions Min, Center, Max along the drive axis x. In this ideal case, there are no quadrature effects; the proof mass is only moved along the drive axis x thanks to perfectly orthogonal spring sidewalls. The neutral point 10 of the proof mass thus remains at the same distance between the two electrodes 2, 3. In this ideal system, displacements along the sense axis z are only due to Coriolis forces or to linear accelerations of the proof mass sensor.

Figure 4B:
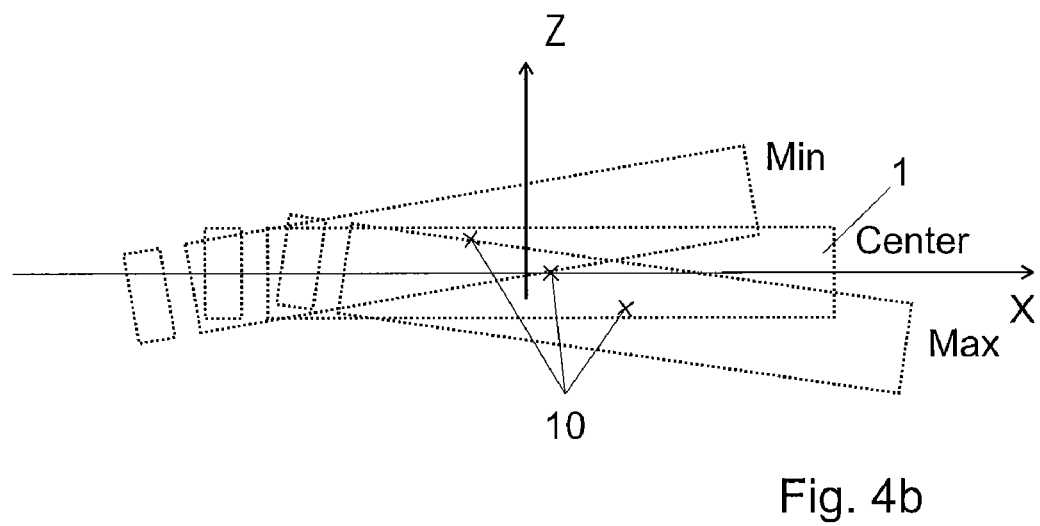

FIG. 4b is a schematic view of a proof mass 1 with a non ideal spring suspension system in the three drive positions Min, Center, Max. Quadrature forces produce a rotation of the proof mass around an axis parallel to the y axis which does not pass through the neutral point, in such a way that when the mass is driven along x, the position of the neutral point 10 along the sense axis is moved even in the absence of any Coriolis or acceleration forces, leading to a quadrature signal.

Figure 4C:
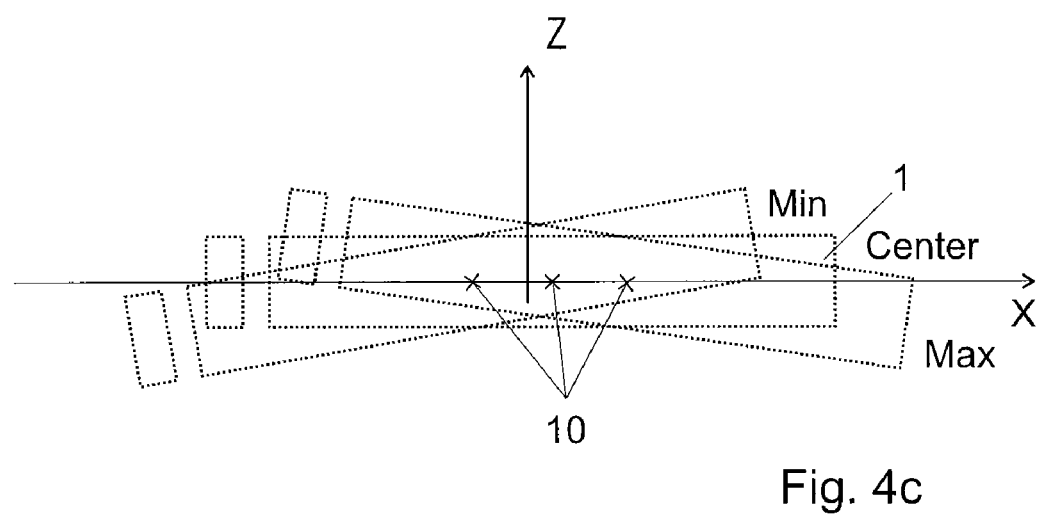

FIG. 4c is a schematic view of a proof mass 1 according to an aspect of the invention. In the embodiment, the spring system and/or external means are designed so that the rotation of the proof mass occurs around an axis $y_2$ passing through or close to the neutral point 10 of the proof mass. The axis $y_2$ (FIG. 3) is fixed with respect to the proof mass and moves along x when the proof mass is vibrated. The geometry is arranged so that quadrature forces do not substantially move the position of the neutral point of the proof mass in the z direction. Although the proof mass is rotated and obviously x-shifted between the Min and Max positions, this has no, or negligible, effects on the capacitance measured by the output electronic circuit.

In this embodiment, the quadrature forces are not cancelled and not even necessarily reduced, and they do translate and rotate the proof mass when this mass is vibrated. However, the system is designed in such a way that this displacement lets the neutral point 10 of the proof mass at a constant position along the sense axis z, and is thus not detected by the electrodes 2, 3.

By solving the equation of movement of the spring mass system in the presence of a coupling spring constant $k_c$, one finds that in a system with the geometry shown on 4c that satisfies the condition $$\frac{I_y}{m} = \frac{k_t}{k_x}, \qquad \text{(Equation 1)},$$

quadrature forces have no or negligible effects on the z-position of the neutral point. In this equation, $k_t$, $k_x$ are the torsional spring constant in the x-z plane and in the x direction respectively, $I_y$ is the moment of inertia of the plate 1 with respect to the axis $y_2$ passing through the neutral point of the plate, and m is the mass of the plate. Compensation of the quadrature generated displacements along the z axis can thus be achieved by a suitable choice of the values $k_t$, $k_x$, $I_y$, and m.

Alternatively to the analytical calculation indicated above, the spring mass design can also be optimized so as to reduce the displacements of the neutral point using numerical finite element calculations.

Other similar design conditions may be derived for other designs than the one illustrated in FIG. 4c.

The geometry of FIG. 4c has thus the advantage that a servo circuit for cancelling the quadrature forces is not required; the quadrature forces are not cancelled, but they have no effect on the position of the neutral point of the proof mass along the sense axis, and thus remain undetected. However, such a servo circuit may be combined with this solution for further reduction of the quadrature error. In an embodiment, a careful design of the spring system that satisfies Equation 1 suppresses most of the contribution of the quadrature forces to the output signal. However, due to manufacturing tolerances, this condition is not exactly fulfilled, i.e. the numerator parenthesis of Equation 2 below is small but non zero. This residual error is cancelled by adjusting the position $Z_0$ of the proof mass by applying time-independent electrostatic forces to the proof mass.

In this case, a servo sensor may be used for measuring quadrature forces and applying forces, for example electrostatic forces, that maintain the proof mass at a certain position $Z_0$ along the sense axis z.

In such a servo system the proof mass is maintained at a certain servo reference position $Z_0$, which can be adjusted by electrical means, for example by changing the offset of the capacitive position detector. The electronic drive circuit thus permanently compensates quadrature generated displacements of the proof mass along the z axis and yields an output signal representing the quadrature forces. Using this quadrature signal delivered by the output circuit, the proof mass position $Z_0$ can be adjusted in order to set the quadrature signal to zero or to a predefined value. This can be done by an adjustment during manufacturing, or periodically during the operation of the device (for example when it is booted), or permanently through a relatively slow feedback loop (for example a feedback loop with a time constant of 1 second or more) that adjusts the electrostatic force applied to the proof mass to maintain the quadrature signal close to zero. The residual quadrature signal has no impact on the measure, since it does not move the position of the neutral point along the sense axis.

Figure 5:
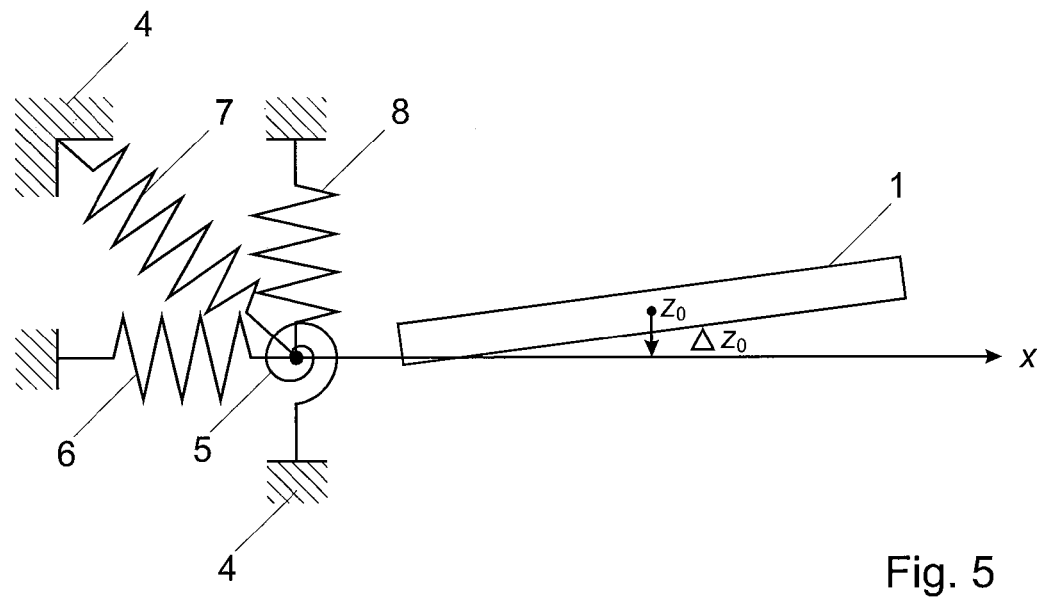
FIG. 5 is a schematic view of the general structure of a proof mass with the neutral point displaced along the sense axis.

FIG. 5 schematically illustrates a model of an example of vibrating gyroscope according to another aspect of the invention. In the embodiment of FIG. 5, the planar proof mass 1 is suspended to the substrate 4 by beams 9. The electrodes 2, 3 (not shown on this figure) and/or other additional electrodes apply electrostatic forces to the proof mass 1 so as to drive it in the drive mode.

In this embodiment, the electronic circuit applies a force that permanently rotates the proof mass, and/or otherwise displaces the neutral point of the proof mass, in order to reduce the effect of quadrature signals on the position of the neutral point along the sense axis. On FIG. 5, the electrostatic force applies a permanent shift $\Delta Z_0$ in the sense direction z to the neutral point 10 of the proof mass 1, which is thus tilted around the attachment point of the springs. In an example, this shift may be achieved by a suitable time independent force, for example using a time independent electrostatic force acting along z that can be applied by the electrodes 2, 3 or by additional electrodes. Other means for tilting the proof mass and for moving its neutral point may be used. This shift is carefully selected, together with the geometry of the system, in order to achieve a position of the neutral point independent of any quadrature forces.

The substantially planar proof mass 1 thus lies in a plane which is not exactly parallel to the drive axis x—even when no quadrature forces and no Coriolis forces are applied. In this position, displacements of the neutral point along z caused by quadrature forces may be reduced.

The following equation specifies the displacement $\Delta Z_0$ which should be applied in order to cancel effects of quadrature forces on the position of the neutral point 10 along z:

$$\Delta z_0 = \frac{k_c k_x \left( \frac{k_t}{k_x} - \frac{l_y}{m} \right)}{b_0 (k_x k_t - k_c^2)} \quad \text{(Equation 2)}$$

In this equation, $b_0$ is the distance between the attachment point of the spring 9 and the neutral point. The numerator parenthesis in this equation becomes zero if Equation 1 is satisfied. One also notes that this displacement depends on the spring imperfection as expressed by the spring constant $k_c$. Therefore, the displacement $\Delta Z_0$ has to be adjusted to each specific device, for example at manufacturing.

Again, additional electrostatic forces acting on the z axis may be used in the embodiment of FIG. 5, in addition to the "tilting force". Those additional electrostatic forces may be used for operating the gyroscope in a servo mode. In this case, time-dependant forces depending on the measured quadrature signal are applied in order to maintain the proof mass at a servo reference position $Z_0$ along the sense axis z.

Figure 6:
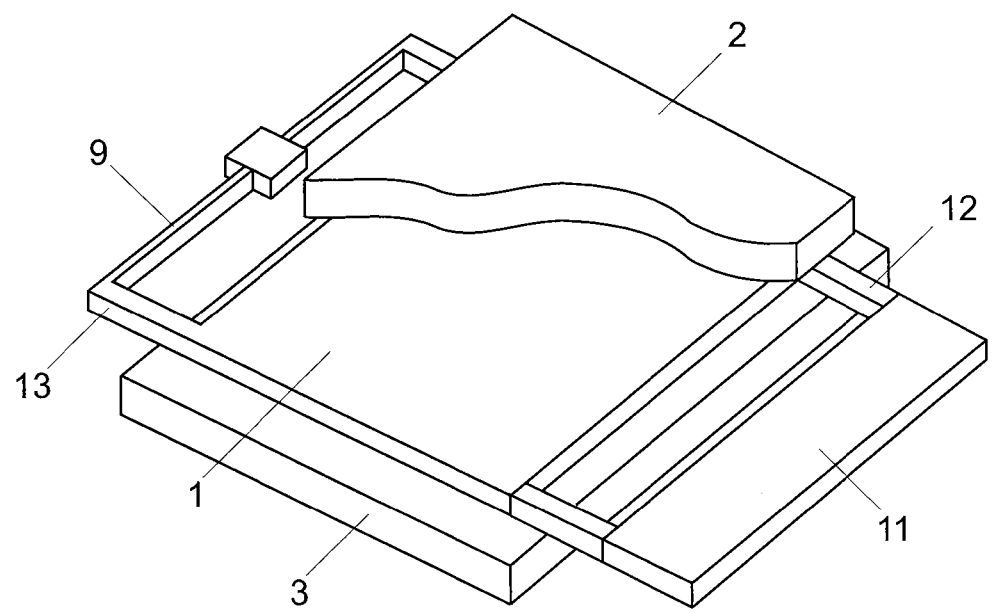
FIG. 6 illustrates a possible embodiment of a vibrating mass comprising a proof mass whose displacement are measured by the electrodes, and a second part whose displacements along the sense axis are not detected by the electrodes.

FIG. 6 illustrates an aspect of the invention where the vibrating mass which is moved by the drive system comprises a proof mass 1 and an additional second part 11. Both parts of the vibrating mass are mutually connected by rigid beams 12. The upper and lower electrodes 2, 3 only detect the displacements of the proof mass but not the displacements of the second part 11. This second part 11 increases the moment of inertia of the vibrating mass, thus gives more freedom for the design of a proof mass with a neutral point that does not move along z when quadrature forces are applied. Other systems with a vibrating mass composed of more than just two parts may be designed. Moreover, other designs comprising different or more springs, including different springs acting in the x and z axis, may also be used.

In another aspect, the invention also relates to the combination of two or more than two systems as described above, for example several systems operating at the same frequency but in anti phase mode in a tuning fork configuration.

Figure 7:
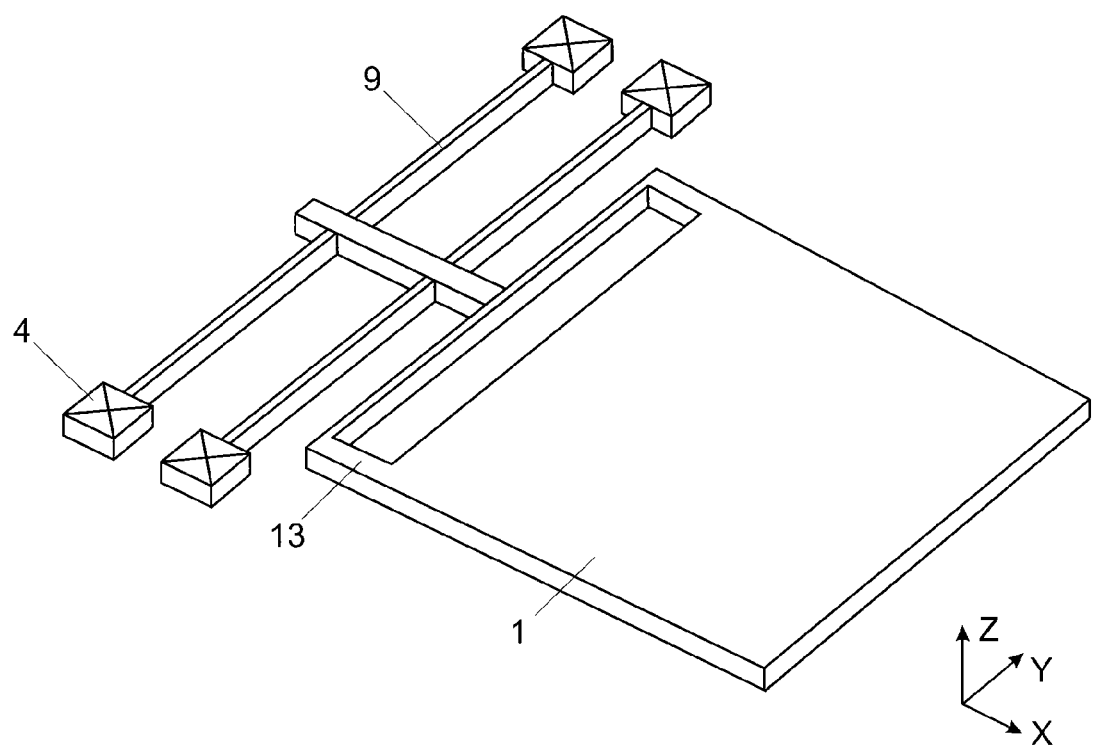
FIG. 7 illustrates another possible embodiment of a proof mass in the form of a plate suspended by two series of straight beams to a substrate.

FIG. 7 illustrates another possible proof mass system that can be used within the invention. The springs 6, 7 and 8 are here composed of two sets of springs in series. The first set is composed of several beams attached to a common connection beam. This set of springs is designed to have essentially a spring constant $k_x$ while the torsional spring constant is much higher than $k_t$. The second set of springs attached to the rigid connection bar has a spring constant in the x direction much larger than the $k_x$ and a torsional spring constant close to $k_t$. Thus $k_x$ is essentially defined by the first set of springs and $k_t$ by the second set of springs. This gives additional design freedom. For example this allows to make the first springs quite long to allow for a large drive excitation while the second set of springs may be designed to obtain the desired torsional spring constant.

LIST OF REFERENCE NUMBERS

1 Proof mass
10 Neutral point of the proof mass, for example center of gravity of the proof mass
11 Second part of proof mass
12 Rigid beams
13 Rigid beams
2 Upper electrode
3 Lower electrode
4 Fixed substrate
5 Rotational Spring
6 x axis spring
7 y axis spring
8 z axis spring
9 Spring (beam)
90 Tip of straight beam (spring)

What is claimed is:

1. A vibrating gyroscope comprising:
   a proof mass with a neutral point;
   a spring suspension system for suspending the proof mass;
   an electrical drive mechanism for vibrating the proof mass along a drive axis; and
   electrodes for building together with at least a part of the proof mass a capacitance system for detecting moves of the proof mass along a sense axis perpendicular to the drive axis;
   wherein the gyroscope being mechanically arranged so that quadrature forces generate rotations of the proof mass around the neutral point of the proof mass and displacements of the proof mass without substantially displacing the neutral point of the proof mass along the sense axis.

2. The vibrating gyroscope of claim 1, wherein the position of the neutral point of the proof mass along the sense axis is substantially independent of its position along the drive axis.

3. The vibrating gyroscope of claim 1, wherein the spring suspension system and the proof mass are designed such that displacements of said neutral point along the sense axis are essentially cancelled by balancing spring forces and inertial forces both related to a rotation movement of the proof mass.

4. The vibrating gyroscope of claim 1, wherein the spring suspension system is designed such that displacements of the neutral point of the proof mass along the sense axis due to a movement of rotation of this mass substantially compensate displacements of said neutral point along the sense axis due to a movement of translation of the proof mass.

5. The vibrating gyroscope of claim 1, wherein the proof mass (1) is tilted around an axis close or crossing the neutral point of the proof mass.

6. The vibrating gyroscope of claim 1, mechanically arranged so that quadrature forces cause a simultaneous tilt and translation of the proof mass, the position of said neutral point of the proof mass remaining at a substantially constant position along the sense axis.

7. The vibrating gyroscope of claim 1, wherein the proof mass comprises a substantially planar plate lying in a plane not parallel to the drive axis.

8. The vibrating gyroscope of claim 1, comprising an electronic circuit for applying a constant electrostatic force to the proof mass in order to tilt it, the value of said force being selected so as to maintain the position of the neutral point of said proof mass along the sense axis independent of its position along the drive axis.

9. The vibrating gyroscope of claim 1, further comprising a servo compensation signal for applying a time dependent electrostatic force to said proof mass that compensates said quadrature force.

10. The vibrating gyroscope of claim 1, comprising a vibrating mass, the vibrating mass comprising said proof mass whose displacements along the sense axis are detected by the electrodes, and at least one second part whose displacements along the sense axis are not detected by the electrodes, wherein the position of the neutral point of the first part along the sense axis remains substantially independent of its position along the drive axis while the position of the center of gravity of the vibrating mass changes.

11. The vibrating gyroscope of claim 10, wherein the proof mass and the second part are rigidly connected.

12. The vibrating gyroscope of claim 11, comprising rigid beams for connecting the proof mass and the second part.

13. The vibrating gyroscope of claim 1, the proof mass being suspended by the spring suspension system in such a way that the proof mass has essentially three degrees of freedom:
- displacements along the drive axis;
- displacement along the sense axis; and
- rotation in the plane defined by the drive axis and the sense axis.

14. The vibrating gyroscope of claim 1, the spring suspension system comprising folded beams.

15. The vibrating gyroscope of claim 1, the spring suspension system comprising several springs in series.

16. The vibrating gyroscope of claim 15, the spring suspension system comprising a first set of springs which essentially define the linear spring constant along the drive axis, and a second set of springs which essentially define the torsional spring constant of the spring suspension system.

17. The vibrating gyroscope of claim 1, wherein the spring suspension system has a resonant frequency such that the frequency of the oscillations along the sense axis is substantially lower than the frequency of oscillations along the drive axis.

18. The vibrating gyroscope of claim 1, comprising a calibrating circuit for adjusting electrostatic forces permanently applied to the proof mass in order to reduce quadrature signals.

19. A method for measuring angular velocity, comprising:
providing a proof mass (1) with a neutral point;
providing a spring suspension system (5, 6, 7, 8; 9) for suspending the proof mass;
vibrating the proof mass along a drive axis (x);
detecting moves of the proof mass along a sense axis (z) perpendicular to the drive axis; and
designing the spring suspension system or applying electrostatic forces to the proof mass in order to reduce displacements of its neutral point (10) along the sense axis (z) caused by quadrature signals, in such a way that the proof mass is tilted when it moves along the drive axis (x), and the neutral point of the proof mass remains at a substantially constant position along the sense axis (z) during rotation.

20. The method of claim 19, further comprising:
calibrating the device by adjusting an electrostatic force permanently applied to the proof mass in order to reduce a quadrature signal.

21. The method of claim 20, wherein the calibration is performed during manufacturing.

22. The method of claim 20, wherein the calibration is performed permanently.

* * * * *